(12) United States Patent
Wentink et al.

(10) Patent No.: US 7,949,358 B2
(45) Date of Patent: May 24, 2011

(54) SYSTEMS AND METHODS FOR DEVICE DISCOVERY

(75) Inventors: Menzo Wentink, Utrecht (NL); Tobias Jeger, Maarssen (NL)

(73) Assignee: Xocyst Transfer AG L.L.C., Wilmington, DE (US)

(*) Notice: Subject to any disclaimer, the term of this patent is extended or adjusted under 35 U.S.C. 154(b) by 415 days.

(21) Appl. No.: 11/314,149

(22) Filed: Dec. 21, 2005

(65) Prior Publication Data

US 2006/0142034 A1  Jun. 29, 2006

Related U.S. Application Data

(60) Provisional application No. 60/638,737, filed on Dec. 23, 2004.

(51) Int. Cl.
 *H04B 7/00* (2006.01)
(52) U.S. Cl. .......................... 455/515; 455/434
(58) Field of Classification Search .................. None
 See application file for complete search history.

(56) References Cited

U.S. PATENT DOCUMENTS

| | | | |
|---|---|---|---|
| 6,850,502 B1 | 2/2005 | Kagan et al. | |
| 6,934,752 B1 | 8/2005 | Gubbi | |
| 6,961,319 B2 | 11/2005 | Novaes | |
| 2003/0123405 A1 | 7/2003 | Del Prado et al. | |
| 2005/0025182 A1* | 2/2005 | Nazari | 370/469 |
| 2005/0048997 A1 | 3/2005 | Grobler et al. | |
| 2005/0068900 A1 | 3/2005 | Stephens et al. | |
| 2006/0089964 A1* | 4/2006 | Pandey et al. | 709/203 |
| 2006/0121929 A1* | 6/2006 | Cave et al. | 455/522 |
| 2009/0042583 A1* | 2/2009 | Cave et al. | 455/450 |

OTHER PUBLICATIONS

International Search Report and Written Opinion.

Roshan, et al., "802.11 Wireless LAN Fundamentals," Chapters 2 and 3, pp. 22-116.

Information Technology—Telecommunications and Information Exchange Between Systems—Local and Metropolitan Area Networks—Specific Requirements—Part 11: Wireless LAN Medium Access Control (MAC) and Physical Layer (PHY) Specifications, International Standard, ISO/IEC 8802-11, Cover page, pp. i-xvi and pp. 1-513.

U.S. Patent Application entitled, "Systems and Methods for the Connection and Remote Configuration of Wireless Clients," U.S. Appl. No. 11/314,143, filed Dec. 21, 2005.

Final Office Action for U.S. Appl. No. 11/314,143, mailed Jul. 7, 2009.

Final Office Action for U.S. Appl. No. 11/314,143, mailed Oct. 6, 2008.

International Preliminary Report on Patentability for PCT/US2005/046210, issued Jun. 26, 2007.

Non-final Office Action for U.S. Appl. No. 11/314,143, mailed Jan. 16, 2009.

Non-final Office Action for U.S. Appl. No. 11/314,143, mailed Mar. 27, 2008.

Notice of Allowance for U.S. Appl. No. 11/314,143, mailed Mar. 26, 2010.

(Continued)

*Primary Examiner* — Phuoc Doan

(57) ABSTRACT

Systems and methods for enabling wireless devices to discover a number of other proximate wireless devices are disclosed. The discovery may include the discovery of network configuration parameters useful for establishing a connection between the wireless devices. The disclosed systems and methods for device discovery may operate in a number of different modes to timely discover wireless devices that receive communications continuously, as well as wireless devices that turn off their wireless receivers for intermittent periods of time. The wireless devices may, for example, communicate using the IEEE 802.11 protocol.

53 Claims, 6 Drawing Sheets

OTHER PUBLICATIONS

International Preliminary Report on Patentability for PCT/US2005/046657 issued Jun. 26, 2007.

International Search Report and Written Opinion for PCT/US2005/46657, mailed Oct. 25, 2006.

Non-final Office Action on U.S. Appl. No. 11/314,143, mailed Jul. 30, 2010.

Roshan, et al., "802.11 Wireless LAN Fundamentals," Chapters 2 and 3, pp. 22-116.

Information Technology—Telecommunications and Information Exchange Between Systems—Local and Metropolitan Area Networks—Specific Requriements—Part 11: Wirelsss LAN Medium Access Control (MAC) and Physical Layer (PHY) Specifications, International Standard, ISO/IEC 8802-11, Cover page, pp. i-xvi and pp. 1-513.

U.S. Patent Application entitled, "Systems and Methods for the Connection and Remote Configuration of Wireless Clients," U.S. Appl. No. 11/314,143, filed Dec. 21, 2005.

Notice of Allowance on U.S. Appl. No. 11/314,143, mailed Dec. 17, 2010.

* cited by examiner

SYSTEMS AND METHODS FOR DEVICE DISCOVERY

CROSS-REFERENCE TO RELATED APPLICATIONS

This application claims priority to, and the benefit of, U.S. Provisional Patent Application entitled "Device Discovery Mechanism," assigned Ser. No. 60/638,737, and filed on Dec. 23, 2004, which is incorporated by referenced in its entirety.

BACKGROUND

1. Field of the Invention

The present disclosure relates to telecommunications in general, and, more particularly, to a technique for discovering proximate wireless devices.

2. Related Art

In general, the IEEE 802.11 standard ("802.11") specifies an over-the-air interface between wireless devices, such as between a wireless client and an access point, or between a number of wireless clients. Within the context of 802.11, a Basic Service Set (BSS) is used to describe a collection of wireless devices which may communicate together within an 802.11 Wireless Local Area Network ("WLAN"). The BSS may, or may not, include an access point (e.g. to provide a connection onto a fixed distribution system such as an Ethernet network or to serve as an intermediary for communications between wireless devices). 802.11 provides methods (which may also be referred to as "mechanisms" or "protocols") for wireless devices to discover a BSS with which they may join. However, 802.11 does not currently include a method for wireless devices to discover other proximate individual wireless devices.

Thus, said another way, current 802.11 standards provide methods for a device to discover a BSS, without specific identification of the devices which may be communicating within that BSS. 802.11 also does not provide for wireless devices to discover other wireless devices that may not be communicating within a BSS at all.

Two types of BSS networks exist: an Independent Basic Service Set ("IBSS") and an Infrastructure Basic Service Set ("Infrastructure BSS"), and each of these types of networks provide methods for wireless devices to discover the respective BSS. A network set up as an IBSS may also be referred to as an "ad-hoc network," and a network set up as an Infrastructure Basic Service Set may be referred to as an "infrastructure network."

Wireless devices communicating on an 802.11 based infrastructure network can discover nearby BSSs through a method known as background scanning. Background scanning is further categorized as either active scanning or passive scanning. In particular, during active scanning, a wireless device may discover a BSS by periodically transmitting probe requests. An access point associated with a BSS is configured to respond to probe requests with a probe response to the scanning wireless device. The probe responses identify the BSS and may also include information the scanning wireless device may need to connect to the BSS.

In addition to the active scan, wireless devices may discover a BSS by passively listening for beacons periodically broadcast by access points associated with the BSS. These beacons provide information about the respective BSS.

Current 802.11 protocols also provide wireless devices with the ability to discover an existing IBSS Network (i.e. ad-hoc network) via an active scan. Although ad-hoc networks do not include an access point that can be used for responding to probe requests from scanning wireless devices, the protocol designates one wireless device in the ad-hoc network, at any particular time, as the device to receive and respond to probe requests, similar to the access point of the Infrastructure BSS. This designated device is typically the device that sent the last beacon, for example.

Additionally, an ad-hoc network may be discovered by a wireless device by passively listening for beacons carrying information about the IBSS. Specifically, a designated wireless device associated with a particular ad-hoc network is configured to transmit beacons that provide information about its associated IBSS.

Accordingly, existing discovery methods enable a wireless device to discover networks (e.g., BSSs), as opposed to discovering other individual wireless devices. The discovery of individual wireless devices may be advantageous for a number of reasons, such as enabling the ability to remotely connect to and/or configure a wireless device, as described in the co-pending, commonly-assigned, U.S. patent application Ser. No. 11/314,143, entitled "Systems and Methods for The Remote Connection and Remote Configuration of Wireless Devices," filed concurrently with the present application and incorporated by reference herein.

The discovery of wireless devices is different from discovering a BSS for a number of reasons. For example, unlike a BSS (which always has a designated device for receiving probe requests), individual wireless devices are not always listening for transmissions from other wireless devices on the same channel (e.g. their base channel). Rather, wireless devices may periodically scan other channels or, for example, may turn off their receiver to save power. Accordingly, what is needed are systems and methods for wireless devices to discover other wireless devices, despite these complications.

SUMMARY

Embodiments for the discovery of devices is provided. One embodiment of a system for discovering a proximate wireless device includes a first device configured to broadcast periodic unsolicited discovery frames. The discovery frames include discovery information associated with the first device. The first device is further configured to scan each channel in a channel set. The scan of each channel includes: broadcasting a discovery request on the channel, listening on the channel for a discovery response sent in reply to the discovery request, and listening for a predetermined period of time on the channel for unsolicited discovery frames wirelessly transmitted by another device.

One embodiment of a method for discovering a wireless device includes scanning each channel in a channel set. The scan of each channel in the channel set includes: broadcasting a discovery request from a scanning wireless device on the channel, and listening for a period of time on the channel for a discovery response transmitted on the channel by each receiving wireless device in response to the broadcast of the discovery request. The discovery response transmitted by each receiving wireless device includes discovery information of the respective receiving wireless device.

One embodiment of a scanning wireless device includes a processor configured to execute instructions for discovering other proximate wireless devices. The instructions executed by the processor include scanning each channel in a channel set. The scan of each channel includes: broadcasting a discovery request from the scanning wireless device on the channel, and listening for a period of time on the channel for a discovery response transmitted on the channel by each receiving wireless device in response to the broadcast of the discovery request. The discovery response transmitted by each receiving wireless device includes discovery information of the respective receiving wireless device.

Yet another embodiment of a method for discovering a proximate wireless device includes iteratively scanning a first channel and a second channel. The iterative scan includes pausing for a predetermined period of time on each of the first and second channel, and at a time when paused on each of the first and second channels: broadcasting a discovery request from a scanning wireless device, listening for any discovery response transmitted by a receiving wireless device in response to the broadcast of the discovery request, and listening for the predetermined period of time for unsolicited discovery frames wirelessly transmitted by another device. The discovery response transmitted by the receiving wireless device includes discovery information of the respective receiving wireless device.

Another embodiment of a method for connecting to a wireless device can include: receiving discovery information from the wireless device; extracting a BSSID or a SSID from the discovery information; and establishing a connection to a network by associating with the BSSID or the SSID extracted from the discovery information.

Other systems, methods, features and/or advantages will be, or may become, apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Embodiments of systems and methods for enabling wireless devices to discover one or more other wireless devices are disclosed. Such a device discovery embodiment may include the discovery of certain network configuration parameters useful for establishing a connection between the wireless devices. The disclosed systems and methods for device discovery may be configured to operate in a number of different modes to timely discover wireless devices that receive messages continuously, as well as wireless devices that turn off their wireless receivers for intermittent periods of time (e.g. for power saving purposes). The wireless devices may, for example, conform to the IEEE 802.11 standard.

It should be understood that any of the methods (including the various device discovery methods) described herein could be implemented within hardware, software, or any combination thereof. For example, when a method is implemented in software, it should be noted that the method can be stored on any computer-readable medium for use by, or in connection with, any computer-related system or method. In the context of this document, a computer-readable medium is an electronic, magnetic, optical, or other physical device or means that can contain or store a computer program for use by, or in connection with, a computer related system or method. The methods can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In some embodiments, where the method is implemented in hardware, the method can be implemented with any, or a combination of, the following technologies, which are each well known in the art: (a) discrete logic circuit(s) having logic gates for implementing logic functions upon data signals, an application-specific integrated circuit (ASIC) having appropriate combinational logic gates, (a) programmable gate array (s) (PGA), a field programmable gate array (FPGA), etc; or can be implemented with other technologies now known or later developed.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Figure 1:
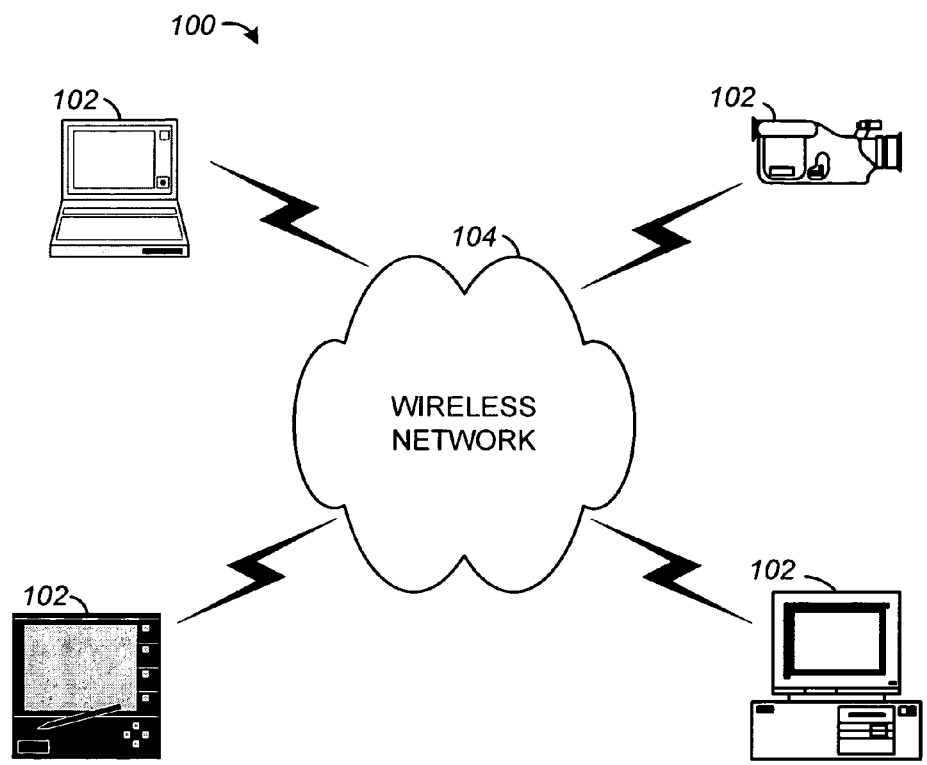
FIG. 1 depicts an embodiment of a device discovery system including a number of wireless devices capable of communicating over a wireless network.

FIG. 1 depicts an exemplary device discovery system 100 comprising a number of wireless devices 102 capable of communicating over a wireless network 104. For example, the wireless device 102 may be, but is not limited to, a wireless enabled: laptop computer, desktop computer, portable computer, camera, portable phone, cellular phone, printer, facsimile machine, scanner, infrared device, router, hub, set-top box, or television set. These, and other wireless devices, may be IEEE 802.11 compliant devices that communicate using the 802.11 protocol.

The 802.11 standard ("802.11") refers to a family of specifications developed by the Institute of Electrical and Electronics Engineers, Inc. (IEEE) for wireless local-area-network (LAN) technology. The IEEE accepted the original 802.11 specification in 1997 and has made several revisions since then. For example, the 802.11 standard, ANSI/IEEE Std 802.11, 1999 Edition (R2003) entitled "Part 11: Wireless LAN Medium Access Control (MAC) and Physical Layer (PHY) Specifications," is incorporated by reference here in its entirety. Additionally, general information may also be referenced in the book entitled "802.11 Wireless LAN Fundamentals," December 2003, by P. Roshan and J. Leary, which is also hereby incorporated by reference in its entirety.

Figure 2:
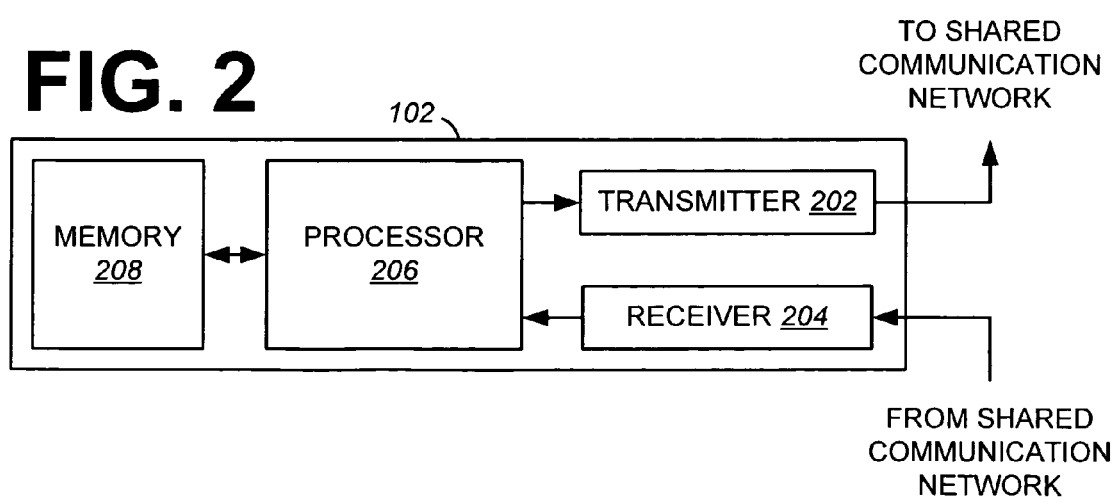
FIG. 2 depicts an exemplary block diagram of a wireless device of the device discovery system embodiment of FIG. 1.

FIG. 2 depicts an exemplary wireless device 102 that may embody the disclosed discovery systems and/or methods. Wireless device 102 may include a transmitter 202, a receiver 204, a processor 206, and a memory 208. The transmitter 202 comprises wireless interface circuitry that enables the wireless device to transmit data communications (e.g. frames, packets, etc.) onto a shared communications network. The shared communications network may comprise a number of independent, shared communication channels. These communications may be generated by processor 206. It will be clear to those skilled in the art how to make and use such a transmitter 202.

The wireless device's receiver 204 comprises wireless interface circuitry that enables a wireless device 202 to receive data communications (e.g. frames, packets, etc.) from the shared communications network. When the receiver receives communications from the shared communications network, it passes the data communications to the processor 206 for processing. It will be clear to those skilled in the art how to make and use such a receiver 204.

Processor 206 may be a general-purpose or special-purpose processor that is capable of performing the functionality described below and with respect to FIGS. 3 through 10. For example, processor 206 is capable of storing data into memory 208, retrieving data from memory 208, and of executing programs stored in memory 208. Memory 208 may accommodate input queues and output queues for incoming and outgoing data communications, respectively. It will be clear to those skilled in the art how to make and use processor 206 and memory 208.

Communication between 802.11 wireless devices occurs over a common channel frequency. In an infrastructure network, an access point's base channel may be user-configured and wireless devices may be configured to automatically tune their transceivers to the channel of the access point having the strongest signal. In an ad-hoc network, wireless devices may be user-configured (or pre-configured) with one of a number of channels as its base channel, which the wireless device is designed to transmit and receive communications on.

Figure 3:
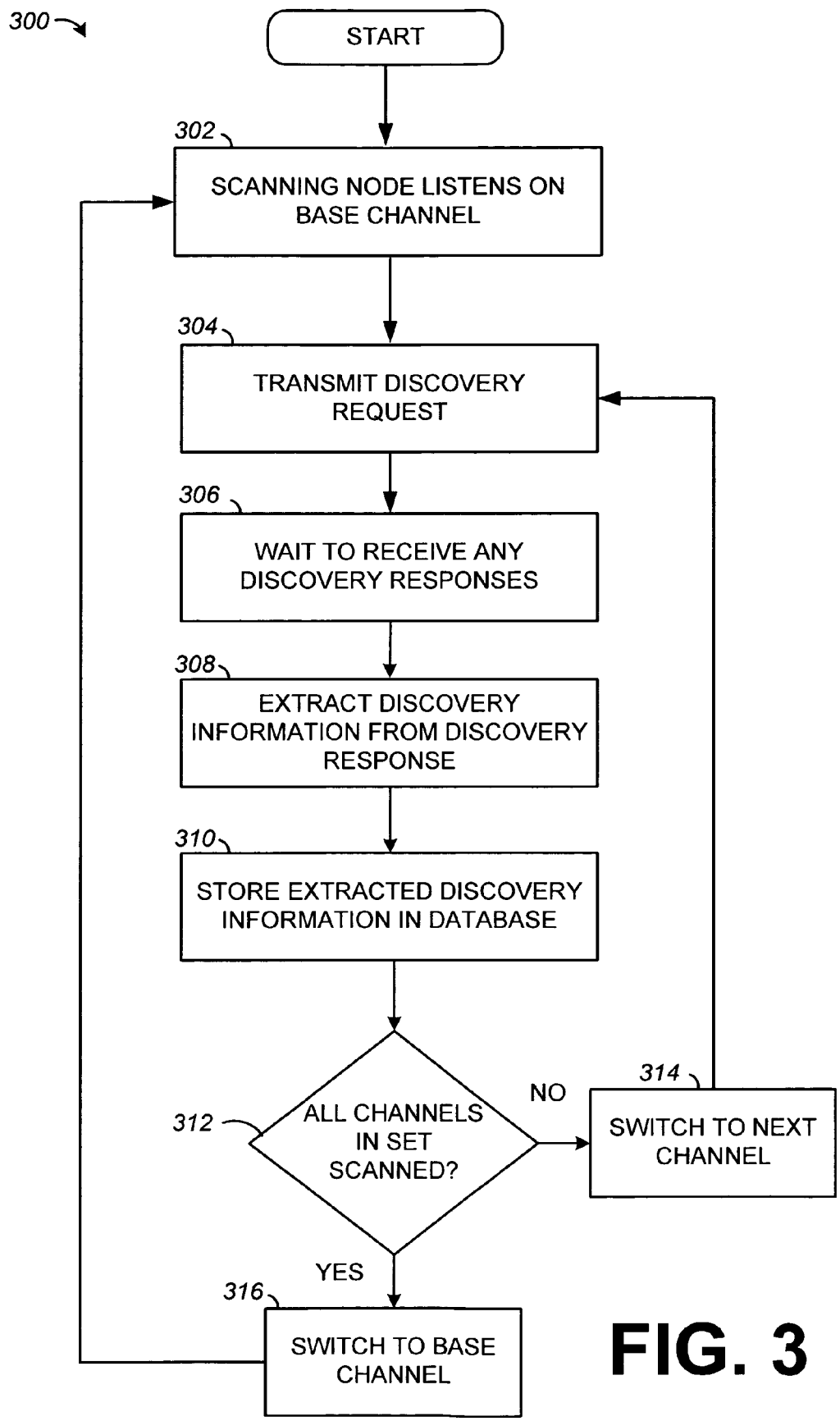
FIG. 3 is a flow diagram depicting an embodiment of an active discovery method used by the scanning wireless device (such as the wireless device of FIG. 2) for discovering a number of receiving wireless devices.

FIG. 3 depicts an embodiment of an exemplary active discovery method 300 that may be used by wireless device 102 to discover other wireless devices 102. For example, a scanning wireless device may use the active discovery method 300 to discover a number of receiving wireless devices. Although the active discovery method 300 is not limited to discovering a wireless device with any particular characteristics, the active discovery method 300, when used alone, may be best used to discover receiving wireless devices that are configured to receive incoming wireless communications on their respective base channel most of the time. That is, to an extent, the active discovery method 300 is performed assuming that the receiving wireless devices do not have their receiver turned off (e.g. as commonly done to save power) at the time of the active scan.

First, at block 302, the scanning wireless device resides, listens, and receives incoming communications on its base channel most of the time. Periodically, the scanning wireless device may begin to scan (i.e., iterate) through a number of predetermined channels. During this scan, at block 304, the scanning wireless device may transmit a device discovery request on the channel. This device discovery request may be referred to herein as a "discovery request." The discovery request is a communication that is recognized by receiving wireless devices as a request for the receiving wireless devices to transmit discovery information associated with the receiving wireless device to the scanning wireless device. For example, the receiving wireless device may recognize an identifier, key, message format, etc. associated with the discovery request to determine that the communication is, in fact, such a discovery request.

In one embodiment, the discovery request is transmitted in a device discovery request frame (herein a "discovery request frame"), which may be broadcast or multicast, for example. A discovery request frame may be any frame defined in the 802.11 standard (e.g. a data frame, a control frame, management frame, etc.), or the frame could be a proprietary frame type. The discovery request frame may include an identifier, a unique format, and/or other information such that receiving wireless devices recognize the frame as a device discovery request frame. For example, an identifier may be stored in the header of the frame, such as in the Address 3 field of an 802.11 medium access control (MAC) frame, which normally holds the basic service set identifier (BSSID) of the wireless device that sent the frame. However, the identifier may be placed in the Address 3 field instead of the sending device's BSSID. Accordingly, receiving wireless devices may be configured to accept and process received frames having this identifier.

Among other information, the discovery request may include device discovery information associated with the scanning device. This device discovery information may be referred to herein as "discovery information." The discovery information associated with the scanning wireless device may provide the receiving wireless device with information that can be used later to establish a connection with the scanning wireless device. The discovery information may include, but is not limited to, the device type, the MAC address (or other identity) of the scanning device, whether the device is operating in a powersave mode, the device's supported services, and the scanning device's base channel, and/or any other information that may be useful for later establishing a connection between the scanning and receiving wireless device. It should be understood that the scanning wireless device's base channel identifies the channel on which the scanning device resides and listens when it is not transmitting, scanning, power saving (e.g. by suspending the receiver), or otherwise unable to receive transmissions on the base channel. Thus, the base channel information may be used to identify to the receiving device what channel the sending device can usually be found on if a connection is desired. The device type may identify, for example, particular information that may assist other wireless devices to more effectively communicate with the scanning wireless device. For example, the device type may indicate whether the device is a printer, scanner, camera, or audio-visual device, etc. The device's supported services may, for example, include chat services, file sharing, a networked image capturing, and so forth. The scanning device's MAC address may serve as an identifier of the wireless device.

In some embodiments the discovery information transmitted by the scanning wireless device may, in itself, implicitly be the device discovery request. For example, in the case that the discovery request is sent as a data frame, or other frame type, the receiving wireless devices may read the discovery information from the frame and determine that the data frame is actually functioning as a device discovery request.

In some embodiments, the scanning device may be configured not to include its associated discovery information along with the discovery request at block 304. Rather, the scanning device may send the discovery request to merely provoke the sending of the discovery response, including discovery information, from any receiving wireless devices. However, including the discovery information with the discovery request can potentially speed up mutual discovery. That is, including the discovery information with the discovery request (or as the discovery request) provides the receiving device with discovery information associated with the scanning device. Accordingly, both the scanning device and receiving device can discover each other in a single exchange of information, and either device may later initiate a connection with the other. If the scanning device does not provide the discovery information to the receiving device, the receiving device will not have the appropriate connection information to connect to the scanning device, unless provided manually or through its own discovery.

The mutual discovery can be established in this case, for example, when the scanning device responds to received discovery information with its own discovery information, which would be transmitted as a unicast frame in this embodiment. While this extended method may add additional frame transmissions, it may also add reliability to the mechanism because, in such an embodiment, all of the discovery information is transmitted as unicast frames. In the remainder of this disclosure it is assumed that the active scan 300 provides mutual discovery at any time.

After sending the discovery request, at block 306, the scanning device may wait on the channel for a period of time to receive any discovery responses addressed to the scanning wireless device. A discovery response is transmitted by each receiving wireless device in response to receiving the discovery request transmitted by the receiving wireless devices at block 304.

A discovery response may be transmitted in a discovery response frame. Like the discovery request frame, the discovery response frame may be any frame defined in the 802.11 standard (e.g. a data frame, a control frame, management frame, etc.), or the frame could be a proprietary frame type, among other types.

The discovery response frame may include discovery information related to the receiving wireless device. As with discovery information sent with a discovery request, the discovery information sent by a receiving wireless device may include, but is not limited to, the device type, the MAC address (or other identity) of the receiving device, whether the receiving device is operating in a powersave mode, the receiving device's supported services, the receiving device's base channel, supported transmission and encryption capabilities, information about the BSS the device is currently connected with (e.g. the service set identifier (SSID) and/or the BSSID), and/or any other information that may be useful for later establishing a connection between the scanning and receiving wireless device.

Thus, receiving wireless devices that receive the device discovery request transmitted by the scanning device (and that recognize the discovery request) may respond with a device discovery response frame addressed to the scanning device. In one embodiment, the listen time (i.e. the time the scanning device remains listening for these discovery response replies) on each scanned channel is long enough to receive a number of discovery response frames. For example, this period of time may be, but is not limited to, the range of 1 ms to 80 ms. Because there may be an equal number of discovery response frames transmitted for each receiving wireless device, in heavily loaded networks with a large number of receiving wireless devices, there may be large numbers of discovery response frames transmitted. Accordingly, the scanning device may remain on the channel long enough to receive each of the discovery response frames.

Once the discovery response frames are received by the scanning wireless device, at block 308, the scanning wireless device may extract the identity of the discovered devices, and any other discovery information, from the discovery response frame. At block 310, the identity of the discovered devices, and any other discovery information, may then be stored in a database such as a table, relational database, or other storage structure. This database may be maintained within the internal memory of the scanning wireless device, for example. The scanning wireless device may then access and use the device information, for example, to establish a connection with the discovered receiving device at a later time.

At decision block 312, if all channels in a channel set have not been scanned, the device switches to communicate on the next channel at block 314, and continues the scan at block 304. However, once all channels in the set have been scanned, the scanning wireless device returns to the base channel at block 316. Once the scanning wireless device returns to the base channel, it may remain listening on the base channel, at block 302, until the next round of active, iterative scanning. The next round of scanning may, for example, occur in predefined intervals, randomly, and/or according to predefined events (e.g. after a reset or boot up of the wireless device).

In some embodiments, it may be advantageous for the scanning wireless client to transmit a discovery request at substantially the same time that the scanning wireless client sends probe request frames (e.g. while active scanning for a BSS). More specifically, for example, during active scanning to discover an Infrastructure BSS (as defined by 802.11), a wireless device cycles through a predetermined set of channels (e.g. 1-11 in North America), and transmits a broadcast probe request frame on each channel in the channel set. Nearby access points receiving the probe request frame are configured to recognize the probe request frame, and respond with a probe response frame. The probe response frame provides information about the access point's associated BSS. Accordingly, after transmitting the probe request frame on one of the channels, the wireless device waits for a time period sufficient to allow probe response frames to be received before moving to the next channel. This time period may be, but is not limited to, approximately 10 to 20 milliseconds.

Accordingly, by piggybacking the active discovery method 300 of FIG. 3 with the active scan, it should be understood that a separate device discovery request frame may be transmitted at substantially the same time as the probe request frame (e.g. at step 304) while iterating through the channels. In this embodiment, the scanning device, at step 306, may also wait for probe response frames transmitted from access points responding to the probe request frame. However, this approach may result in additional network traffic because both the probe request frame and the device discovery request frame are broadcast separately over the channel.

Figure 4:
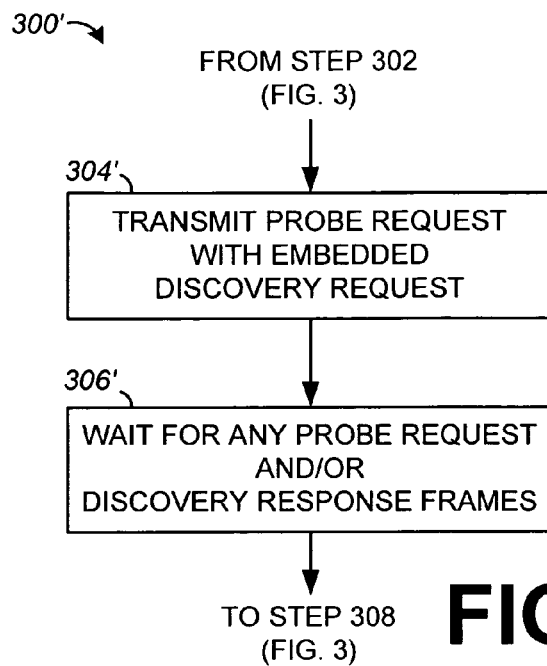
FIG. 4 is a flow diagram depicting another embodiment of the active discovery method of FIG. 3 in which a discovery request and/or discovery information may be embedded within a probe request frame.

Accordingly, in some embodiments, as depicted by the active discovery method 300' in FIG. 4, a discovery request and/or discovery information (which may implicitly function as the discovery request) may be embedded within a probe request frame, potentially alleviating this potential increase in traffic. Thus, the active discovery method 300' may not include transmitting a separate discovery request frame in addition to the probe request frame. In effect, the probe request frame also functions as a discovery request in such an embodiment.

In such an embodiment, the discovery request and/or discovery information may be embedded within the custom data field of the probe request frame. Thus, it should be understood that, in addition to the standard data found in a probe request frame (e.g. frame control, duration, destination and source address, etc.), probe request frames may also include this custom data field for holding user defined data, such as the discovery request and/or discovery information. For example, the user defined information inside the probe request frames may be included in the form of generic information elements using type-length encoding. These information elements may be added without changing the basic structure of the probe request frame.

Looking closer to FIG. 4, at block 304', which picks up from block 302 of FIG. 3, a probe request frame having the embedded discovery request is transmitted to the "broadcast" SSID to provoke a response from every nearby access point. Probe response frames are sent back as acknowledgments by the receiving access points on the channel. As also defined by 802.11, these probe response frames contain information necessary for successful connection to the wireless network (e.g. BSS) associated with the access point. Thus, wireless devices receiving the probe response frames may extract and use the information to establish a connection to the BSS.

In existing 802.11 systems, wireless devices other than access points may be configured to discard probe request frames. However, using the embodiment of FIG. 4, receiving wireless devices may be configured to receive and process the received probe request frames. For example, upon receipt of the received probe request frame, the receiving wireless device may be configured to receive the probe request frames and determine whether a device discovery request and/or device discovery information exists within the probe request frame. Upon detecting that a device discovery request and/or device discovery information exists within the probe request frame, the receiving wireless device may extract the device discovery request and/or device discovery information from the probe request frame. The receiving wireless device may then be configured to respond to the extracted device discovery request and/or information as if the request and/or information were received in its own discovery frame, as described with respect to the discovery method 300 of FIG. 3.

At block 306', as defined by the 802.11 standard, after sending a probe request frame, the scanning device listens for probe response frames sent by any access points which received the probe request frame. However, unlike the current 802.11 standard, the scanning device may also wait on the channel for a period of time to receive any discovery response frames that are transmitted, and addressed to, the scanning wireless device.

Once the discovery response frames are received by the scanning wireless device, the scanning wireless device may extract the identity of the discovered devices and any other associated discovery information from the discovery response frame, store the information in a database, and potentially continue scanning as discussed with respect to steps 308-316 of the discovery method 300 of FIG. 3.

Accordingly, because a separate device discovery request frame is not transmitted, an embodiment that embeds the device discovery request in the probe request frame has the potential advantage that a smaller number of frames may be transmitted over the wireless medium during the discovery process.

In yet another embodiment, access points may be configured to discover nearby devices by passively collecting the device discovery information included within probe request frames and/or discovery request frames. The identity of the discovered devices and any other associated discovery information extracted from the received frames may then be stored in a database such as a table, relational database, or other storage structure. This database may be maintained within memory associated with the receiving access point. The associated memory may reside within the access point, or could reside within the memory of a device in communication (wired or wireless) with the access point. Any wired or wireless device in communication with the access point may then access and use the stored discovery information to discover other devices identified in the database. A wireless device may use the stored discovery information to establish a connection with any wireless device having discovery information stored in the database. The connection may be established through the access point, or may be established through a direct wireless connection if the device accessing the database also has a compatible wireless interface with the device associated with the stored discovery information.

In some embodiments, a wireless device may iterate through each channel and announce (e.g. broadcast or multicast) its associated discovery information without issuing a discovery request. For example, a wireless device may associate with another BSS on a channel other than its original base channel. In such a situation, the wireless device may iterate through each channel in the channel set shortly before, or after, changing to the new base channel, in order to announce the wireless device's updated discovery information. This updated discovery information designates the wireless device's new base channel and BSS. This discovery information may be transmitted without requesting that receiving wireless devices send their respective discovery information. That is, if the wireless device that switched channels is already aware of the other wireless devices, there may be no need to request the other wireless device's information.

Discovery information sent without an associated discovery request (including the case when transmitted discovery information is not intended to function as an implied discovery request) may be transmitted within a discovery frame. Unlike a discovery request frame, a discovery frame does not provoke a discovery response from a receiving wireless client.

Figure 5:
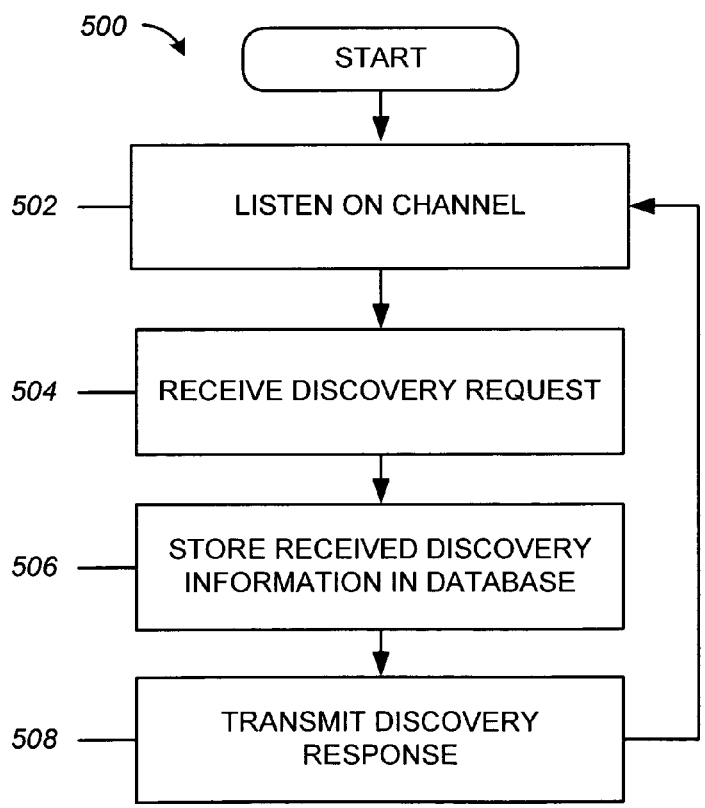
FIG. 5 is a flow diagram depicting an exemplary discovery method that one of a number of receiving wireless devices may perform to cooperate with the scanning wireless device's active discovery methods of FIG. 3 or 4.

FIG. 5 depicts a flow diagram of an exemplary discovery method 500 that a receiving wireless device may perform to cooperate with the active discovery method 300 and/or 300' of the scanning wireless device. At block 502, the receiving wireless device listens on a channel, which may be its base channel, until it receives an incoming frame. At block 504, the receiving wireless device receives a discovery request, which may be transmitted in a discovery request frame, a probe request frame, or other frame, for example.

At block 506, if the discovery request also includes discovery information, the receiving device may extract the identity of the discovered scanning device and any other associated discovery information from the discovery request. The identity of the discovered scanning devices and any other associated discovery information may then be stored in a database such as a table, relational database, or other storage structure. This database may be maintained within the internal memory of the receiving wireless device. The receiving wireless device may then use the device information, for example, to establish a connection with the scanning wireless device at a later time.

At block 508, in response to receiving the discovery request from the scanning wireless device, the receiving wireless device may transmit a discovery response on the shared channel to the scanning wireless device. The discovery response may include the discovery information of the receiving wireless device.

Although not depicted, the receiving wireless device may also be configured to transmit a probe response in response to any received probe requests sent by the scanning wireless device. Thus, if the discovery request received at block 504 is encapsulated within a probe request frame, the receiving wireless device may be configured to issue a probe response, in addition to the discovery response at block 508.

In some embodiments, at block 508, a receiving device may be configured to send a device discovery request encapsulated inside a transmitted discovery response, to provoke a discovery response to be transmitted to the receiving device from the scanning wireless device.

More specifically, an embodiment that encapsulates a discovery request inside a transmitted discovery response may be implemented as follows. First, a scanning wireless device may send (e.g. via multicast or broadcast), a device discovery request without its associated device discovery information (e.g., FIG. 3, block 304). Upon a receiving wireless device receiving the discovery request, the receiving wireless device may send a discovery response and a discovery request to the scanning wireless device. The discovery request may be embedded within the discovery response. The scanning wireless device may then respond with a discovery response, which also includes the scanning wireless device's discovery information. Accordingly, both the scanning and receiving wireless devices may store the received device discovery information of the other device in their respective databases for later use.

The effect of shortening the device discovery request frame by omitting the device discovery information at step 304 of FIG. 3 increases the probability of receipt of the discovery request frame by any receiving devices. Another potential advantage of this embodiment (e.g. over including the discovery information with the discovery request) is that the discovery responses, which include the device discovery information, may be transmitted to the scanning wireless device as unicast frames, which may increase the reliability of the device discovery.

Figure 6:
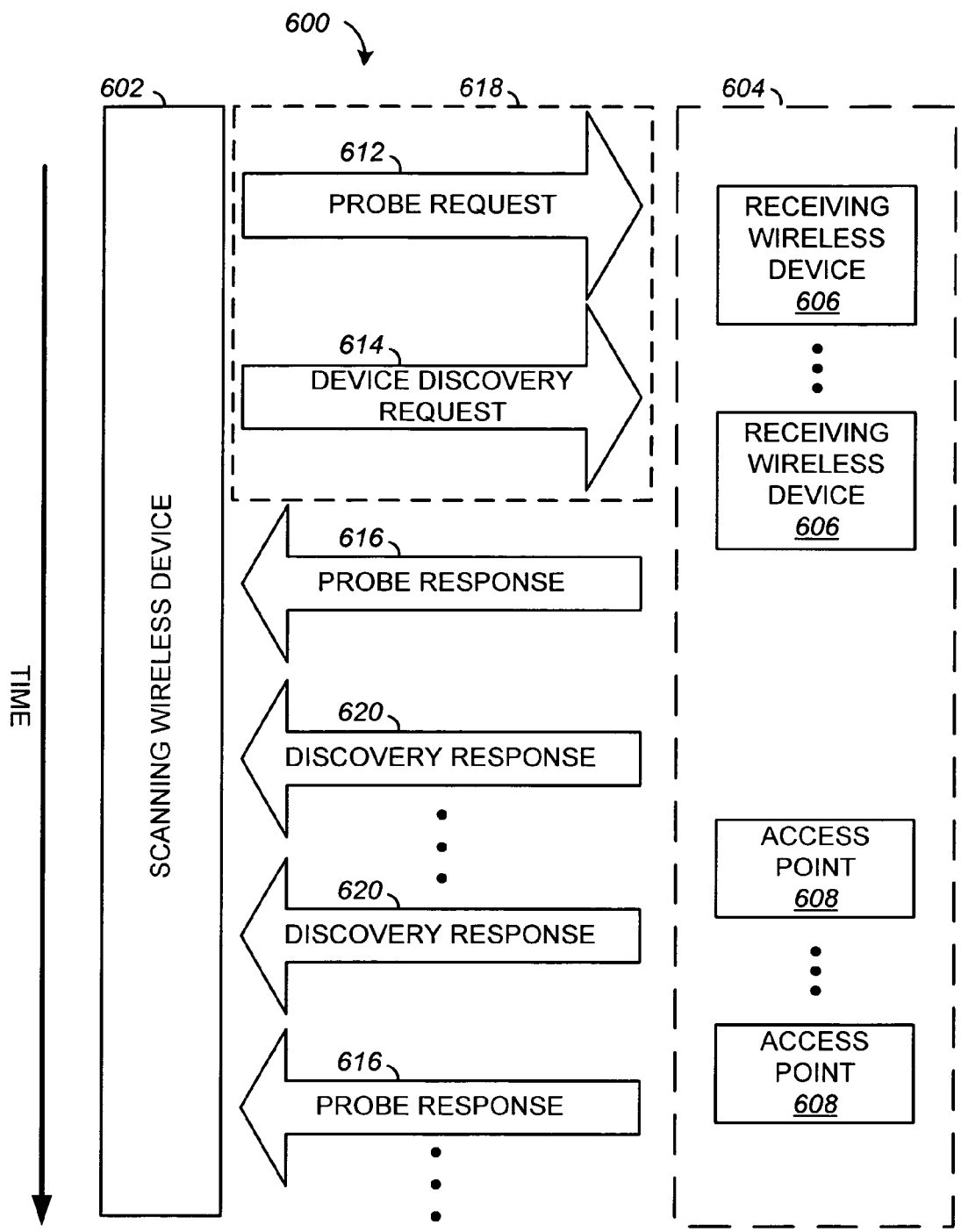
FIG. 6 is a block diagram depicting an example of the frames transmitted across the wireless network of FIG. 1 during the active device discovery methods of FIGS. 3-5.

FIG. 6 depicts an exemplary embodiment of the messages communicated during the discovery methods 300 and 300' and 500 of FIGS. 3-5. Specifically, FIG. 6 depicts the frames 600 that may be transmitted between a scanning wireless device 602 and the wireless devices 604 within the communication range of scanning wireless device 602. The wireless devices 604 may, for example, include a number of receiving wireless devices 606 and a number of wireless access points 608 configured to receive messages on the channel from which the scanning wireless device 602 is transmitting.

For the purposes of illustration, FIG. 6 depicts an embodiment in which the discovery requests are sent at the same time as, or within, a probe request. Thus, for each channel, a probe request frame 612 may be broadcast on the channel and will be received by receiving wireless devices 604 communicating on the channel. Additionally, a device discovery request frame 614 may be broadcast on the channel for receipt by wireless devices 604 communicating on the channel. Although probe request frame 612 is depicted as being sent before the device discovery request frame 614, there is no such requirement. It should also be understood that, in embodiments in which the device discovery request frame 614 is sent as a separate frame, there is no requirement that the probe request frame 612 be sent at all. Rather, the device discovery request frame 614 is sent at substantially the same time as the probe request frame 614 for convenience. That is, because the scanning wireless device 602 may already be configured to iterate through each of the channels in the channel set for the purpose of broadcasting the probe request frame 612 (and receiving the associated probe response frames 616), this is also a good time to send the device discovery request frame 614 on each channel.

Each of the access points 608 may respond to a received probe request frame 612 by sending a probe response frame 616. Likewise, each of the receiving wireless devices 606 receive the device discovery request 614 and, in response, may transmit a discovery response frame 620, which may include discovery information.

Although the frames 600 are generally depicted as being communicated in a specific order with respect to time, FIG. 6 is only an example, and the depicted frames may be transmitted and received in a number of different sequences. Thus, it should be understood that the probe response frames 616 and device discovery response frames 620 may be transmitted by wireless devices 604 and received by the scanning wireless device 602 in any particular order, and do not have to follow the example of FIG. 6. Further, it should be understood that the frames communicated between the scanning wireless device 602 and wireless devices 604 may follow the medium access methods specified by the protocol used. For example, 802.11 communication networks use the medium access protocol known as carrier sense multiple access with collision avoidance (CSCMA/CA).

In embodiments in which the device discovery request and/or device discovery information is embedded in the probe request frame 612, it is not necessary to transmit the separate device discovery request frame 614. Rather, a single hybrid frame 618, comprising a probe request frame 612 having the device discovery request and/or device discovery information embedded therein, may be transmitted to the wireless devices 604 on each channel. The receiving wireless devices 604 may be configured to parse the hybrid frame 618 to extract the device discovery request and/or device discovery information, and reply with the device discovery response frames 620. In addition, access points 608 respond with their respective probe response frames 616.

Figure 7:
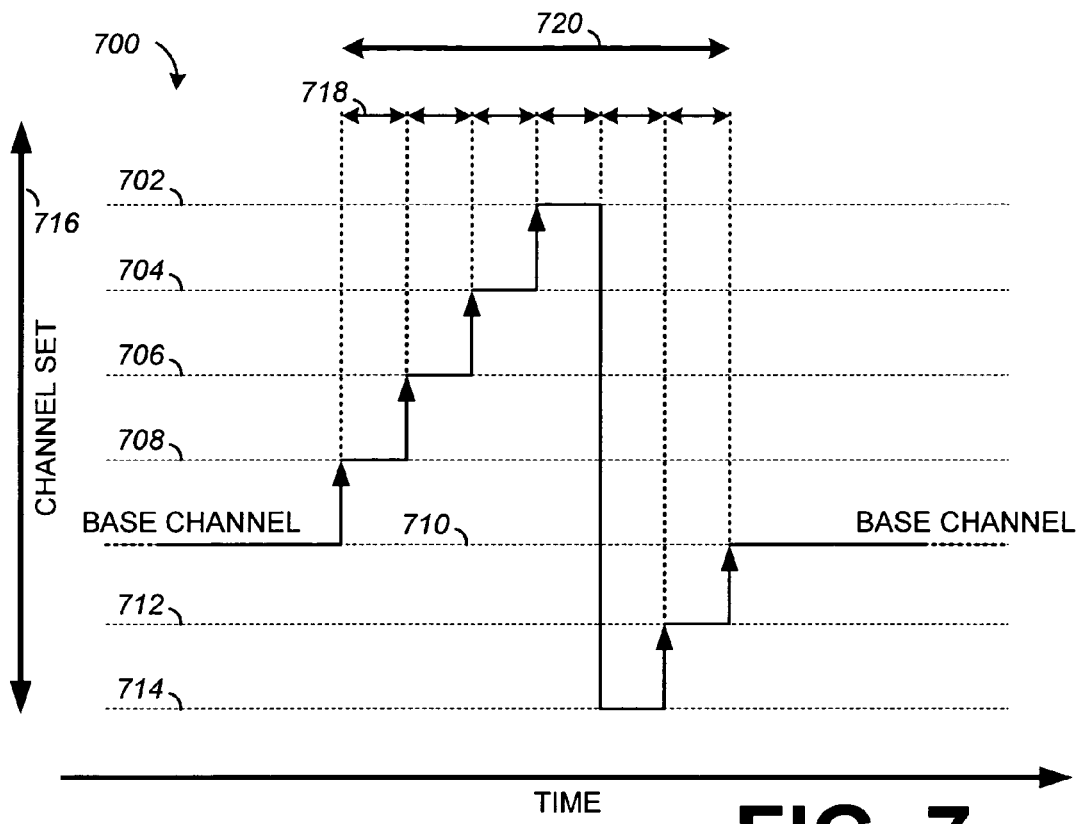
FIG. 7 depicts an embodiment of the iterative channel switching that occurs according to the device discovery method described with respect to FIG. 3.

FIG. 7 depicts an example of the iterative channel switching 700 that occurs according to the active device discovery methods described with respect to FIGS. 3-6. As described with respect to FIG. 3, for example, during active discovery, the scanning wireless device (FIG. 6, 602) may discover other wireless devices by iteratively scanning each channel in a channel set. According to the embodiment of FIG. 7, the scanning device 602 iterates through seven channels 702-714 in the channel set 716 to discover the receiving wireless devices (FIG. 6, 606) that are receiving communications on each of the channels 702-714. The scanning device may reside and listen on the base channel 710 most of the time, as described with respect to block 302 of FIG. 3. However, at block 304 (FIG. 3) the scanning device begins scanning, iterating through each of channels 702-714 to complete blocks 304-316 of FIG. 3. On each channel, messages are communicated between the scanning wireless device 602 and the wireless devices 604 as described with respect to FIGS. 3-6. The scanning wireless device waits for probe response frames and discovery response frames during the listen period 718 on each channel.

Although FIG. 7 depicts channels 702-714 as being scanned sequentially, the channels may be scanned in any order, including simultaneously. Additionally, the channel set 716 need not include every channel that the scanning wireless device is capable of scanning. Rather, the scanning wireless device may be configured to scan a subset of channels (which may be a single channel) which it is capable of scanning.

In some embodiments, the duration 720 of the channel scan (on channels other than the base channel) is minimized, in order to reduce the probability of missing any frames transmitted to the scanning wireless device on the base channel. In some embodiments, scanning wireless devices may utilize a receive window to avoid the loss of frames on each channel, but this implies that the wireless devices also periodically transmit a frame to notify the receiving wireless devices of the receive window.

Figure 8:
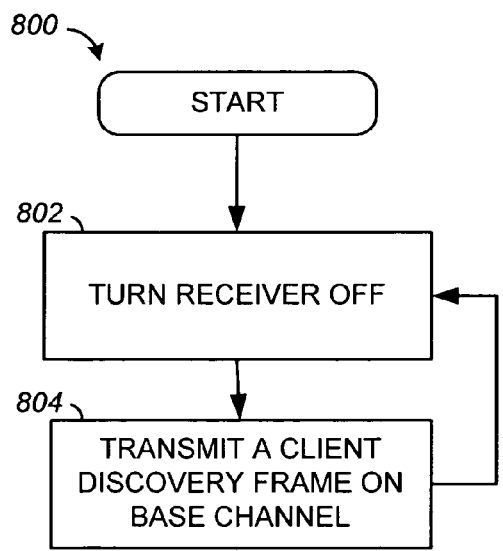
FIG. 8 is a flow diagram depicting an embodiment of a passive discovery method executed by a transmitting wireless device, such as the wireless device of FIG. 1.
Figure 9:
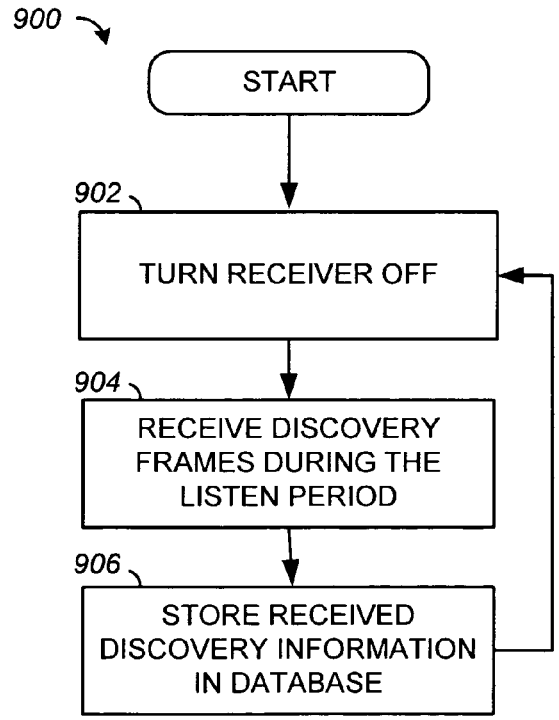
FIG. 9 is a flow diagram depicting an embodiment of a passive discovery method executed by a receiving wireless device, such as the wireless device of FIG. 1.

Now that embodiments have been described for wireless devices to actively scan to discover other wireless devices, an embodiment of a passive device discovery method for discovering wireless devices is described with respect to FIGS. 8 and 9.

The passive device discovery methods described with respect to FIGS. 8 and 9 may be most useful for, but is not limited to, discovering wireless devices that are configured not to receive incoming wireless messages on their respective base channel for a substantial amount of the time. For example, wireless devices are often configured to turn off their receivers for a substantial amount of time for the purpose of saving power, or are otherwise intermittently unavailable to receive communications on any particular channel for a substantial time frame. Accordingly, these wireless devices may be referred to here generally as "intermittent devices."

FIG. 8 depicts an embodiment of a passive discovery method 800 executed by a transmitting device, and FIG. 9 depicts an embodiment of a passive discovery method 900 executed by a receiving device. Although not required to be implemented by an intermittent device, discovery methods 800 and 900 are described and depicted as being implemented by an intermittent device. Thus, looking to the passive discovery method 800 of FIG. 8, at block 802, an intermittent wireless device may turn its receiver 204 (FIG. 2) off for a substantial amount of the time (e.g., to save power). Accordingly, the wireless device may not receive messages (e.g., frames or other communications) on its base channel while the receiver is powered off. However, at block 804 the wireless device may be configured to periodically transmit via its transmitter 202 (FIG. 2) an unsolicited device discovery frame including the sending intermittent device's discovery information on its base channel. The unsolicited discovery frame transmission may be a broadcast transmission. This periodic transmission of the device discovery frame does not consume a great deal of power, and thus may be successfully used in powersave applications. The periodic discovery frames may be transmitted every 100 ms, for example.

The unsolicited, periodic discovery frames transmitted on the base channel may be distinguished from discovery request frames for at least the reason that a discovery frame is not serving to invoke a receiving device to reply with its own discovery information. Rather, the discovery frames merely broadcast the transmitting wireless device's discovery information to receiving wireless devices.

Looking now to FIG. 9, a passive discovery method 900 executed by the receiving wireless device is described. First, at block 902, an intermittent device may keep its receiver off for an amount of time. However, at block 904, the receiving wireless device is configured to periodically receive transmissions (e.g. by powering on its receiver). The duration of time that the receiving wireless device is able to receive transmissions may be called the listen period. The listen period may be configured to be equal to, or longer than, the duration between the unsolicited device discovery frames sent from a transmitting device (e.g. the period of time between the execution of block 804 of FIG. 8). Thus, any wireless device listening on the transmitting wireless device's base channel may receive the discovery frame periodically transmitted by the transmitting wireless device.

At block 906, the receiving wireless devices may then extract the discovery information from any discovery frames received from a transmitting wireless device, and the identification of the wireless device that sent the discovery frame, including any other discovery information, may be stored in a database (e.g., to later establish a connection with the sending wireless device). Accordingly, the receiving wireless devices are made aware of, and discover, the transmitting wireless device. After the listen period ends, the wireless device again may turn off the wireless receiver for a period of time at block 902 until opening another listen period.

It should be understood that the same wireless device may execute both discovery method 800 and discovery method 900. Discovery method 800 serves to announce the transmitting wireless device's discovery information to other receiving wireless devices, while discovery method 900 serves to receive discovery information from other wireless devices.

It should be understood that the passive discovery methods 800 and 900 may be used by devices other than intermittent devices. That is, this approach of periodically transmitting and receiving unsolicited discovery frames may be implemented by devices that do not turn their receivers. However, in practice, it is likely more bandwidth efficient to use the active discovery methods described with respect to FIGS. 3-7 for such devices. Additionally, in most cases, the active device discovery methods described with respect to FIGS. 3-7 discover wireless devices faster than the passive discovery of FIGS. 8-9.

Figure 10:
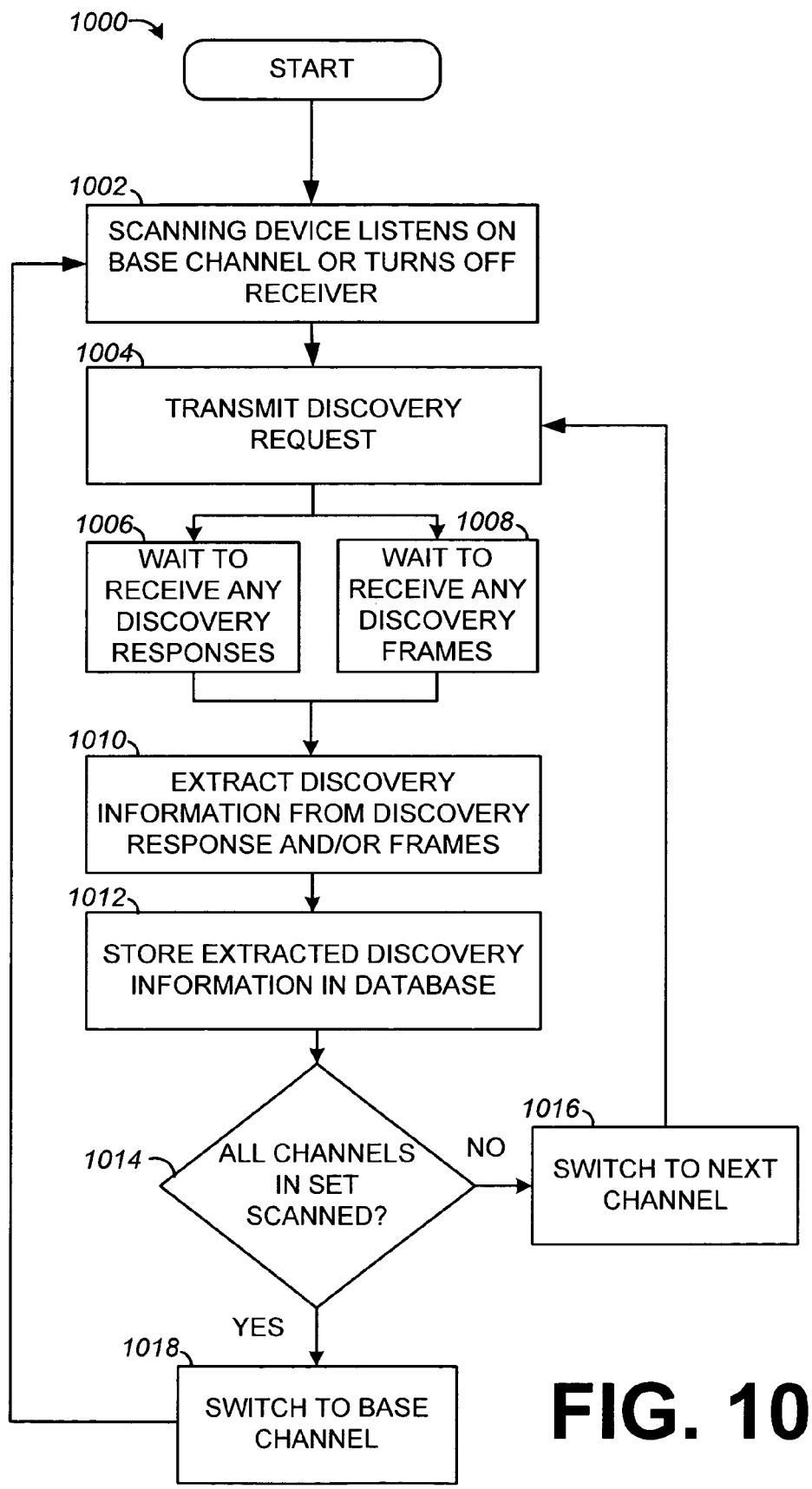
FIG. 10 is a flow diagram depicting an embodiment of a hybrid discovery method that may be used by a wireless device, such as the wireless device of FIG. 1, to discover other proximate wireless devices.

Accordingly, because of the potential advantages to each approach, as depicted in FIG. 10, wireless devices may also use a combined active and passive discovery method, referred to as hybrid discovery method 1000, to combine the benefits of both approaches. Thus, hybrid discovery method 1000 may be a combination of the active and scanning methods described with respect to FIGS. 3-9, above.

Hybrid discovery method 1000 may be used by both intermittent and non-intermittent devices. However, in practice, the hybrid discovery method 1000 may be most useful when used by intermittent devices because it can operate by power-saving mode, while active discovery method 300 may be the most efficient discovery process for non-intermittent devices. However, one skilled in the art can appreciate that method 100 could be used in either of such devices. In general, the hybrid discovery method 1000 iteratively scans each of a number of channels as with the active discovery of FIG. 3. Thus, a discovery request may be transmitted on each channel (e.g. FIG. 3, block 304). However, in addition to waiting for discovery responses (e.g. FIG. 3, block 306), the wireless device also waits on each channel to receive any discovery frames periodically transmitted by other devices (e.g. FIG. 8, block 804), which in the present embodiment may be intermittent devices (e.g. FIG. 9, block 904).

Thus, more specifically, looking to FIG. 10, at block 1002, the scanning device may listen on its base channel or may turn off its receiver altogether. That is, an intermittent device may not listen on the channel for periods of time, and may power off its transmitter, for example. In contrast, a non-intermittent device may keep its receiver powered on, and listen on the channel most of the time.

At block 1004, a discovery request may be transmitted as with the active discovery embodiments described with respect to FIGS. 3-7. The discovery request may include discovery information, so that non-intermittent devices can discover the scanning intermittent device. At block 1006, any discovery responses are received, as with the active discovery embodiments described with respect to FIGS. 3-7.

However, in addition to waiting for discovery responses, at block 1008, the scanning wireless device also waits a period of time (the listen period) to receive any unsolicited discovery frames periodically transmitted on the respective channel being scanned. Accordingly, looking back to FIG. 7, the listen period 718 of the scanning device (e.g. the time between performing each iteration of block 704 of FIG. 7) may be selected to be a duration equal to, or greater than, the period of time between the intermittent discovery frame transmissions of another wireless device.

Thus, it should be understood that some devices, such as intermittent devices, may be configured to periodically transmit unsolicited discovery frames as described with respect to passive discovery method 800, and these devices are discovered by the scanning wireless device by listening for the periodic transmission of the discovery frames on each channel during the iterative scan.

By way of example, if the scanning wireless device is an intermittent wireless device, it can discover other intermittent devices by listening for the periodic transmission of the discovery frames on each channel during the iterative scan (block 1008). The scanning intermittent wireless device can be discovered by non-intermittent devices when the scanning intermittent device sends a discovery request (block 1004) that is accompanied by discovery information while actively scanning the base channel of the receiving non-intermittent device.

Looking to block 1010, any discovery information in the received discovery response frames or discovery frames is extracted. At block 1012, the extracted discovery information is stored in a database accessible by the wireless device. At block 1014, it is determined whether all channels in the set have been scanned. If not (the NO condition), the scanning device switches to the next channel at block 1016, and repeats steps 1004-1014 on the next channel. If all channels have been scanned (the YES condition), the device may return to its base channel at block 1018, and again, begin listening on the base channel or turn off the receiver, until the next round of scanning.

During the hybrid discovery method 1000, any wireless devices receiving discovery requests transmitted from the scanning wireless device at step 1004 are discovered upon the scanning wireless device receiving the discovery information transmitted in a respective discovery response frame. Because intermittent devices will most likely have their receiver turned off, and will not receive the discovery requests transmitted by the scanning wireless device, from a practical standpoint, intermittent devices are not generally discovered using the discovery request and discovery response exchange. Thus, non-intermittent devices are most likely to be discovered by the scanning wireless device using the discovery request and discovery response exchange of the hybrid discovery method.

In addition, because the scanning wireless device listens on each scanned channel for a period of time adequate to receive any unsolicited discovery frames periodically transmitted by other wireless devices (e.g. intermittent devices transmitting periodic device discovery frames according to discovery method 800), the scanning device will also discover each of these wireless devices on each scanned channel. Thus, from a practical standpoint, non-intermittent devices are most likely to be discovered by the scanning device using this portion of the hybrid scan, because intermittent devices are most likely configured to send the periodic discovery frames.

In summary, the following non-limiting example may best explain a practical implementation of the described hybrid discovery method 1000. In one embodiment, each intermittent device may periodically transmit an unsolicited discovery frame as described with respect to the passive discovery method 800 of FIG. 8. Each of the intermittent devices may also periodically perform the hybrid discovery method 1000 of FIG. 10. In addition, each of the non-intermittent devices perform the hybrid scan 1000 of FIG. 10, and are otherwise listening on their respective base channel. Non-intermittent devices, in the present embodiment, are not configured to transmit the unsolicited discovery frames. However, non-intermittent devices are configured to listen and reply to discovery requests as described with respect to the active discovery embodiment of FIG. 5.

For each scanning device (intermittent or non-intermittent) performing a hybrid scan, non-intermittent devices are discovered through the discovery request and discovery response exchange on each channel. Additionally, because the scanning device also waits (e.g. listens) long enough on each channel to receive the unsolicited discovery frames transmitted by each of the proximate intermittent devices, each intermittent device on each channel is also discovered by the scanning wireless device.

It should be understood that, if all devices are non-intermittent, the active discovery methods of FIG. 3-5 may be used without the addition of the passive discovery concepts of FIGS. 8 and 9. However, for wireless devices in the network which do not receive communications all the time, the passive discovery concepts may be introduced into the active discovery methods to form a hybrid discovery method that more efficiently discovers both intermittent and non-intermittent wireless devices.

Once discovered, to allow for sending frames to non-intermittent devices after their discovery, the non-intermittent device may power up its associated receiver on its base channel periodically for a short period of time, referred to as the receive window. The beginning of the receive window may be demarcated by the transmission of a frame which indicates the beginning, and possibly duration, of this connection period. The demarcation may be included in the periodic unsolicited transmission of the discovery information. The discovery information may also implicitly demarcate the beginning of a connection period, with a predetermined period of time. Any traffic that needs to be exchanged with the non-intermittent device is transmitted to the non-intermittent device during the receive window, because there is no other pre-defined period of time during which the intermittent station will be on a pre-defined channel with its receiver powered on.

Yet another method to establish a connection with a discovered device is by connecting to the network that the discovered device has indicated it belongs to. That is, if the SSID and/or BSSID is included in the discovery information, the receiving device may configure itself to connect to this network to connect with the discovered device.

It should be emphasized that many variations and modifications may be made to the above-described embodiments. All such modifications and variations are intended to be included herein within the scope of this disclosure and protected by the following claims.

The invention claimed is:

1. A method comprising:
   broadcasting, with a wireless device, a discovery request frame on an alternative channel of a channel set, wherein the channel set includes at least the alternative channel and a base channel of the wireless device, and wherein the discovery request frame includes an indicator configured to cause non-access point receiving wireless devices to process and respond to the discovery request frame;
   listening on the alternative channel for a discovery response transmitted on the alternative channel by a receiving wireless device in response to the discovery request frame; and
   processing the discovery response transmitted by the receiving wireless device to obtain discovery information regarding the receiving wireless device.

2. The method of claim 1, further comprising:
   residing a transceiver of the wireless device on the base channel during a first time period;
   scanning each alternative channel in the channel set during a second time period;
   listening on the alternative channel for an unsolicited discovery frame transmitted by at least one wireless device other than the wireless device; and
   processing the unsolicited discovery frame to obtain discovery information of the at least one wireless device other than the wireless device.

3. The method of claim 1, further comprising:
   transmitting, periodically, a plurality of unsolicited discovery frames on the base channel of the wireless device.

4. The method of claim 1, wherein the discovery request frame includes an indication of the base channel of the wireless device.

5. The method of claim 1, further comprising using the discovery response to establish a direct wireless connection to the receiving wireless device.

6. The method of claim 1, further comprising embedding the discovery request frame in a probe request frame.

7. The method of claim 1, further comprising:
   embedding a discovery request in a probe request frame;
   wherein broadcasting the discovery request frame includes broadcasting the probe request frame on the alternative channel at substantially the same time as the discovery request frame.

8. The method of claim 1, further comprising:
   storing the discovery information in a database accessible by the wireless device.

9. The method of claim 1, wherein the discovery response includes a second discovery request; and
   transmitting a unicast frame to the receiving wireless device in response to the second discovery request, wherein the unicast frame includes discovery information of the wireless device.

10. The method of claim 1, further comprising:
    transmitting a plurality of periodic unsolicited discovery frames on the base channel, wherein each of the plurality of periodic unsolicited discovery frames includes discovery information of the wireless device.

11. The method of claim 10, further comprising powering off a receiver associated with the wireless device between transmissions of the plurality of periodic unsolicited discovery frames.

12. The method of claim 10, further comprising, after transmitting the plurality of periodic unsolicited discovery frames on the base channel, listening for an amount of time on the base channel for an unsolicited discovery frame transmitted by at least one wireless device other than the wireless device, wherein the amount of time is equal to or longer than a time between successive unsolicited discovery frames transmitted by the at least one wireless device.

13. The method of claim 10, further comprising:
    periodically powering on a receiver for a duration of a receive window; and
    demarcating a beginning of the receive window by transmitting a receive window start indication frame.

14. The method of claim 13, wherein the receive window start indication frame is transmitted on the base channel.

15. The method of claim 1, wherein the indicator is an identifier stored in a header of the discovery request frame.

16. The method of claim 15, wherein the discovery request frame is an 802.11 MAC frame, and wherein the identifier is stored in a BSSID field of the discovery request frame.

17. A scanning wireless device comprising:
    a transceiver including a transmitter configured to transmit data and a receiver configured to receive data; and
    a processor configured to:
    broadcast a discovery request frame on an alternative channel of a channel set via the transmitter, wherein the channel set includes at least the alternative channel and a base channel of the scanning wireless device, and wherein the discovery request frame includes an indicator configured to cause non-access point receiving wireless devices to process and respond to the discovery request frame;
    listen on the alternative channel via the receiver for a discovery response transmitted on the alternative channel by a receiving wireless device in response to the discovery request frame; and
    process the discovery response transmitted by the receiving wireless device to obtain discovery information of the receiving wireless device.

18. The wireless device of claim 17, wherein the processor is further configured to:
    listen on the alternative channel via the receiver for an unsolicited discovery frame transmitted by at least one wireless device other than the scanning wireless device; and
    process the unsolicited discovery frame to obtain discovery information of the at least one wireless device other than the scanning wireless device.

19. The wireless device of claim 17, wherein the processor is further configured:
    extract a second discovery request from the discovery response transmitted by the receiving wireless device.

20. The wireless device of claim 19, wherein the processor is further configured to:
    transmit a unicast frame to the receiving wireless device via the transmitter in response to the second discovery request, wherein the unicast frame includes discovery information of the scanning wireless device.

21. The wireless device of claim 17, wherein the processor is further configured to:
    transmit a plurality of periodic discovery frames via the transmitter, wherein each of the plurality of periodic discovery frames includes discovery information of the scanning wireless device.

22. The wireless device of claim 17, wherein the processor is further configured to:
    embed the discovery request frame in a probe request frame.

23. The wireless device of claim 17, wherein the processor is further configured to:
embed a discovery request in a probe request frame; and
broadcast the probe request frame on the alternative channel via the transmitter at substantially the same time as the discovery request frame.

24. The scanning wireless device of claim 17, wherein the discovery request frame includes an indication of the base channel of the scanning wireless device.

25. The scanning wireless device of claim 17, wherein the indicator is an identifier stored in a header of the discovery request frame.

26. The scanning wireless device of claim 25, wherein the discovery request frame is an 802.11 MAC frame, and wherein the identifier is stored in a BSSID field of the discovery request frame.

27. A system for discovering a proximate wireless device comprising:
a first device comprising:
a transceiver including a transmitter configured to transmit data and a receiver configured to receive data; and
a processor configured to:
broadcast periodic unsolicited discovery frames including discovery information associated with the first device on a base channel via the transmitter;
scan each alternative channel in a channel set, wherein the channel set includes at least an alternative channel and the base channel of the first device,
broadcast a discovery request frame on the alternative channel via the transmitter, wherein the discovery request frame includes an indicator configured to cause non-access point receiving wireless devices to process and respond to the discovery request frame; and
listen on the alternative channel via the receiver for a discovery response sent in reply to the discovery request and for unsolicited discovery frames wirelessly transmitted by another device.

28. The system of claim 27, wherein the first device is further configured to transmit the unsolicited discovery frames periodically at a time interval less than or equal to a time period in which the first device listens on the alternative channel for unsolicited discovery frames transmitted by another device.

29. The system of claim 27, further comprising a second device configured to:
receive the discovery request frame on the alternative channel; and
transmit a discovery response including discovery information associated with the second device to the first device in response to receiving the discovery request frame.

30. The system of claim 29, wherein the second device is configured to broadcast periodic unsolicited discovery frames including discovery information associated with the second device on a time interval less than or equal to a time period in which the first device listens on the alternative channel for unsolicited discovery frames.

31. The system of claim 29, wherein the second device further includes:
a receiver configured to be intermittently powered off; and
a transmitter configured to broadcast unsolicited discovery frames at a time when the receiver is powered off.

32. The system of claim 27, wherein the discovery request frame includes an indication of the base channel of the first device.

33. The system of claim 27, wherein the indicator is an identifier stored in a header of the discovery request frame.

34. The system of claim 33, wherein the discovery request frame is an 802.11 MAC frame, and wherein the identifier is stored in a BSSID field of the discovery request frame.

35. A system for discovering a proximate wireless device comprising:
means for residing a transceiver of a wireless device on a base channel during a first time period, and for iteratively scanning a first alternate channel and a second alternate channel during a second time period;
means for broadcasting a discovery request frame, wherein the discovery request frame includes an indicator configured to cause non-access point receiving wireless devices to process and respond to the discovery request frame;
means for listening for any discovery response transmitted by a receiving wireless device in response to the broadcast of the discovery request frame, and for any unsolicited discovery frames wirelessly transmitted by any other wireless device; and
means for processing a discovery response transmitted by the receiving wireless device to obtain discovery information of the receiving wireless device.

36. The system of claim 35, further including:
means for broadcasting periodic unsolicited discovery frames including discovery information associated with the wireless device.

37. The system of claim 35, further including:
means for intermittently powering off a receiver associated with the wireless device; and
means for broadcasting unsolicited discovery frames at a time when the receiver is powered off.

38. The system of claim 35, wherein the discovery request frame includes an indication of the base channel of the wireless device.

39. The system of claim 35, wherein the indicator is an identifier stored in a header of the discovery request frame.

40. The system of claim 39, wherein the discovery request frame is an 802.11 MAC frame, and wherein the identifier is stored in a BSSID field of the discovery request frame.

41. A method comprising:
transmitting a discovery request frame from a transmitter of a first wireless device, wherein the discovery request frame includes discovery information of the first wireless device, wherein the discovery request frame is transmitted on an alternate channel of a channel set that includes a base channel of the first wireless device, and wherein the discovery request frame includes an indicator configured to cause non-access point receiving wireless devices to process and respond to the discovery request frame;
receiving, at the first wireless device, discovery information from a second wireless device in a discovery response on the alternate channel;
extracting a basic service set identifier (BSSID) or a service set identifier (SSID) from the discovery information; and
establishing a connection to a network on the alternate channel by associating with the BSSID or the SSID extracted from the discovery information.

42. The method of claim 41, wherein the discovery request frame includes an indication of the base channel of the first wireless device.

43. The method of claim 41, wherein the indicator is an identifier stored in a header of the discovery request frame.

44. The method of claim 43, wherein the discovery request frame is an 802.11 MAC frame, and wherein the identifier is stored in a BSSID field of the discovery request frame.

45. A tangible computer-readable medium having instructions stored thereon, the instructions comprising:
- instructions for broadcasting, via a transceiver of a wireless device, a discovery request frame on an alternative channel of a channel set, wherein the channel set includes at least the alternative channel and a base channel of the wireless device, and wherein the discovery request frame includes an indicator configured to cause non-access point receiving wireless devices to process and respond to the discovery request frame;
- instructions for listening on the alternative channel for a discovery response transmitted on the alternative channel by a receiving wireless device in response to the discovery request frame; and
- instructions for processing the discovery response transmitted by the receiving wireless device to obtain discovery information regarding the receiving wireless device.

46. The tangible computer-readable medium of claim 45, further comprising:
- instructions for residing the transceiver of the wireless device on the base channel during a first time period; and
- instructions for scanning each alternative channel in the channel set during a second time period.

47. The tangible computer-readable medium of claim 45, further comprising instructions for establishing a direct wireless connection to the receiving wireless device based on the discovery information regarding the receiving wireless device.

48. A method comprising:
- receiving, via a transceiver of a receiving wireless device, a discovery request frame from a transmitting wireless device, wherein the discovery request frame is received on an alternative channel of the transmitting wireless device, wherein the alternative channel is part of a channel set that includes at least the alternative channel and a base channel of the transmitting wireless device, and wherein the discovery request frame includes an indicator configured to cause non-access point receiving wireless devices to process and respond to the discovery request frame;
- transmitting a discovery response to the transmitting wireless device on the alternative channel in response to the discovery request frame, wherein the discovery response includes discovery information regarding the receiving wireless device; and
- establishing a direct wireless connection with the transmitting wireless device.

49. The method of claim 48, wherein the indicator is an identifier stored in a header of the discovery request frame.

50. The method of claim 48, wherein the discovery request frame includes an indication of the base channel of the transmitting wireless device.

51. A wireless device comprising:
- a transceiver configured to receive a discovery request frame from a transmitting wireless device, wherein the discovery request frame is received on an alternative channel of the transmitting wireless device, wherein the alternative channel is part of a channel set that includes at least the alternative channel and a base channel of the transmitting wireless device, and wherein the discovery request frame includes an indicator configured to cause non-access point receiving wireless devices to process and respond to the discovery request frame; and
- a processor configured to:
  - transmit, via the transceiver, a discovery response to the transmitting wireless device on the alternative channel in response to the discovery request frame, wherein the discovery response includes discovery information regarding the wireless device; and
  - establish a direct wireless connection with the transmitting wireless device.

52. The wireless device of claim 51, wherein the discovery request frame is an 802.11 MAC frame, and wherein the indicator is stored in a field of the discovery request frame.

53. The wireless device of claim 51, wherein the processor is further configured to monitor at least the alternative channel for the discovery request frame.

* * * * *

UNITED STATES PATENT AND TRADEMARK OFFICE
CERTIFICATE OF CORRECTION

PATENT NO.        : 7,949,358 B2
APPLICATION NO.   : 11/314149
DATED             : May 24, 2011
INVENTOR(S)       : Wentink et al.

It is certified that error appears in the above-identified patent and that said Letters Patent is hereby corrected as shown below:

Title Page 2, item (56), under "Other Publications", in Column 2, Line 1, delete "Requriements—Part 11: Wirelsss" and insert -- Requirements—Part 11: Wireless --.

Column 18, line 49, in Claim 19, delete "configured:" and insert -- configured to: --.

Signed and Sealed this
Twenty-third Day of August, 2011

David J. Kappos
*Director of the United States Patent and Trademark Office*